United States Patent
Wielinga et al.

[11] Patent Number: 6,117,520
[45] Date of Patent: Sep. 12, 2000

[54] HONEYCOMB BLOCK

[75] Inventors: Henk Wielinga, Helmond; Piet Klomp, Someren, both of Netherlands

[73] Assignee: AB Volvo, Sweden

[21] Appl. No.: 09/043,082

[22] PCT Filed: Sep. 11, 1996

[86] PCT No.: PCT/SE96/01134

§ 371 Date: May 7, 1998

§ 102(e) Date: May 7, 1998

[87] PCT Pub. No.: WO97/10098

PCT Pub. Date: Mar. 20, 1997

[30] Foreign Application Priority Data

Sep. 11, 1995 [SE] Sweden .................. 9503134

[51] Int. Cl.[7] ................................. B32B 3/12
[52] U.S. Cl. ................ 428/116; 428/55; 428/68; 428/72; 428/77; 428/118; 428/212; 296/188; 296/189
[58] Field of Search ............... 428/116, 118, 428/73, 55, 54, 47, 45, 77, 212, 135, 68, 72; 296/189, 188; 188/371, 377

[56] References Cited

U.S. PATENT DOCUMENTS 4,352,484  10/1982  Gertz et al. ................ 256/13.1
5,106,668  4/1992  Turner et al. ............... 428/116
5,306,066  4/1994  Saathoff ..................... 296/146.6
5,460,865  10/1995  Tsotsis ....................... 428/16

FOREIGN PATENT DOCUMENTS 0 624 459 A2  11/1994  European Pat. Off. .
95/25646  9/1995  WIPO .

*Primary Examiner*—Deborah Jones
*Assistant Examiner*—Abraham Bahta
*Attorney, Agent, or Firm*—Lerner, David, Littenberg, Krumholz & Mentlik, LLP

[57] ABSTRACT

A honeycomb block comprises three sections of honeycomb elements characterized in that the cell size of each honeycomb element section decreases from a large size in one section to a smaller size in the neighboring sections and an even smaller size in the third section. The honeycomb block may be fabricated from strips of cardboard which are glued together to form the honeycomb cell structure. The honeycomb block may be used as an impact force absorbing element in a door of a vehicle where the cell size in each honeycomb element section decreases from a large size in one section to a smaller size in the neighboring section and the smallest sized cells is facing inward with respect to the passenger compartment of the vehicle.

11 Claims, 1 Drawing Sheet

HONEYCOMB BLOCK

TECHNICAL FIELD

The present invention relates to a honeycomb block according to the preamble of claim 1.

BACKGROUND OF THE INVENTION

Honeycomb panels with one layer of hexagonally shaped cells sandwiched between backing sheets are known. One use is as side protection/impact force absorbing elements in the doors of vehicles. These panels are e.g. made of paper which provides a cheap, simple and light construction. The problem is to achieve a door construction which on one hand can absorb a high proportion of the energy released in a collision and, on the other hand, does not add too much weight and cost to the vehicle. The known honeycomb panels do not have sufficient impact absorbing capacity for this use neither can their impact absorbing capacity be varied.

SUMMARY OF THE INVENTION

It is therefore an object of the present invention to provide a honeycomb block which can absorb a high proportion of the energy directed towards the block, e.g. during a collision, but which still is light and simple and cheap to manufacture.

A further object of the present invention is to provide a honeycomb block which has the desired properties regarding energy absorption also when it is desirable that these properties vary in the thickness direction of the block.

This object is achieved in accordance with the present invention by a honeycomb block according to claim 1.

The honeycomb block, in accordance with the present invention, comprises at least two layers of honeycomb elements. These layers can be of the same or different thickness. Each layer comprises a middle part made up of the honeycomb cells, and two outer sheets delimiting the middle part. The honeycomb cell sizes can be the same or different for the layers. The specific combination of layer thicknesses and cell sizes depend upon the desired energy absorption properties which are to be imparted to the block.

Preferred embodiments of the present invention are detailed in the dependent claims.

BRIEF DESCRIPTION OF THE DRAWINGS

The invention will be described in greater detail in the following by way of example only and with reference to the attached drawings, in which.

DETAILED DESCRIPTION OF PREFERRED EMBODIMENTS

Figure 1:
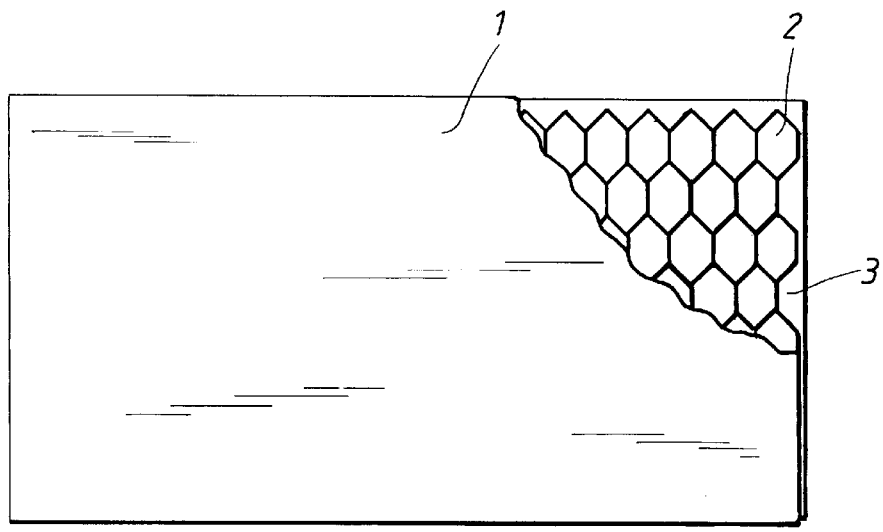
FIG. 1 is a schematic view perpendicular to one of the backing sheets of a honeycomb block according to the invention, where the top right corner of the backing sheet has been removed.

As is evident from FIG. 1, the honeycomb cell structure 2 is covered by a front sheet 1 and a back sheet 3. The cells are made up of strips which are folded to form the honeycomb pattern and the strips are secured to each other, after which the sheets are attached.

Figure 2:
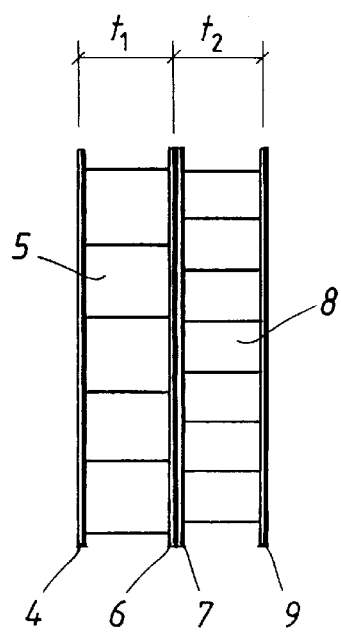
FIG. 2 is a schematic side view of one embodiment of the block in FIG. 1.

The cross sectional view of a block according to the invention represented in FIG. 2 shows a block comprising two honeycomb element layers attached flat side to flat side. The layers are preferably glued together. Backing sheets 4 and 6 surround a honeycomb section 5, backing sheets 7 and 9 surround another honeycomb section 8. The section 5 has a thickness $t_1$, and the section 8 has a thickness $t_2$. These thicknesses $t_1$, and $t_2$ can be equal or different. The honeycomb cell sizes in sections 5 and 8 can also be equal or different. The cell size is either the length of one side in the hexagonal, for equal sides, or the longest distance between two opposite corners, for a "stretched" hexagonal shape.

Figure 3:
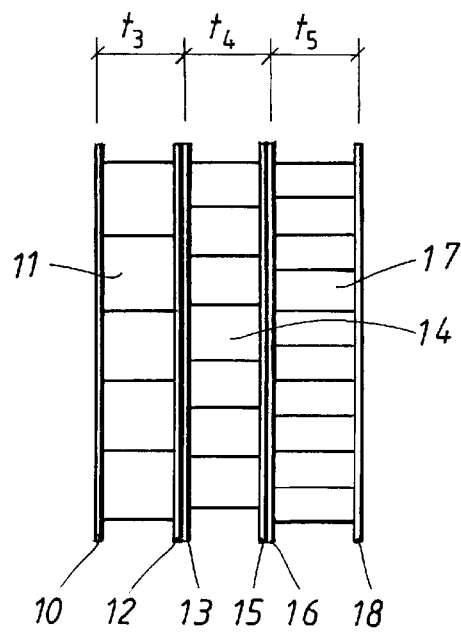
FIG. 3 is a schematic side view of another embodiment of the block in FIG. 1.

The alternative embodiment shown in FIG. 3 comprises three honeycomb element layers attached in a similar manner to the panel in FIG. 2. Backing sheets 10 and 12 surround a honeycomb section 11, backing sheets 13 and 15 surround another honeycomb section 14 and backing sheets 16 and 18 surround yet another honeycomb section 17. The section 11 has a thickness $t_3$, the section 14 has a thickness $t_4$ and the section 17 has a thickness $t_5$. These thicknesses $t_3$, $t_4$ and $t_5$ can be equal or different. The honeycomb cell sizes in sections 11, 14 and 17 can also be equal or different. A particularly preferable embodiment has a large cell size in section 11, a smaller cell size in section 14 and an even smaller cell size in section 17, i.e. the cell size decreases from a large size in section 11 to a small size in section 17.

Honeycomb blocks according to the invention are particularly useful as side protection/impact force absorbing elements in the doors of vehicles. When using honeycomb element layers with varying cell sizes, the large size cells are usually facing out from the passenger compartment and, hence, the smaller size cells facing inwards. This construction enables an energy absorption with a desired progress in the thickness direction of the block, e.g. a smooth capture of a colliding object.

The honeycomb cells are advantageously fabricated from strips of recycled cardboard which are glued together to form the honeycomb pattern. The backing sheets have to have a higher strength than recycled paper can give, so they are preferably made from non-recycled cardboard/paper. The backing sheets can have one side covered with a layer of glue which fastens to the honeycomb cell structure.

The honeycomb blocks can also be made in several segments to fit in different cavities in the door.

Another advantageous embodiment is attained by wrapping the whole block in sealing plastic to protect the honeycomb blocks from moisture.

Still another advantageous embodiment is to have only one backing sheet between two layers glued back to back, i.e. in FIG. 2 only one of the layers 6 and 7 would be present. It is also possible to glue two honeycomb structures together using no backing sheets, or, possibly, using only backing sheets facing outwards and inwards, e.g. in FIG. 2 only backing sheets 4 and 9 would be present and none of 6 and 7.

The present invention is not restricted to the embodiments described above and illustrated by way of example in the drawings, but may be varied within the scope of the appended claims.

It is to be understood that the term "honeycomb block" is intended to encompass at least two layers of honeycomb elements attached together flat side to flat side while the term "honeycomb element layer" denotes a honeycomb cell structure with one backing sheet covering each flat end of the structure.

What is claimed is:

1. A honeycomb block adapted for insertion in a vehicle door comprising an inner surface adapted to face inwardly with respect to a passenger compartment of said vehicle, a first inner honeycomb section including a plurality of honeycomb elements having a first size and disposed proximate to said inner surface, a second intermediate honeycomb section including a plurality of honeycomb elements having a second size, a third outer honeycomb section including a plurality of honeycomb elements having a third size, and an outer surface adapted to face outwardly from said vehicle, said third size being greater than said second size and said second size being greater than said first size whereby upon impact said honeycomb block provides for gradually hardened impact during the course of said impact.

2. The honeycomb block of claim 1 wherein said second intermediate honeycomb section includes a pair of outer walls between said second intermediate honeycomb section and said first inner honeycomb section and said third outer honeycomb section, respectively.

3. The honeycomb block of claim 1 wherein said first inner honeycomb section has a first thickness, said second intermediate honeycomb section has a second thickness, and said third outer honeycomb section has a third thickness and wherein said first, second, and third thickness are substantially the same.

4. The honeycomb block of claim 3 wherein said first inner honeycomb section has a first thickness, said second honeycomb section has a second thickness and said third honeycomb section has a third thickness wherein said first, second and third thicknesses are different.

5. The honeycomb block of claim 1 including a sealing plastic layer, said sealing plastic layer wrapped around said honeycomb block.

6. The honeycomb block of claim 1 wherein said pluralities of honeycomb elements are composed of cardboard strips.

7. The honeycomb block of claim 6 wherein said cardboard strips are glued together to form said pluralities of honeycomb elements.

8. The honeycomb block of claim 2 wherein said pluralities of honeycomb elements are composed of cardboard strips.

9. The honeycomb block of claim 8 wherein said cardboard strips are glued together to form said pluralities of honeycomb elements.

10. The honeycomb block of claim 9 wherein said pair of outer walls comprise cardboard, and including a glue layer for attaching said pair of outer walls to said first inner honeycomb section, said second intermediate honeycomb section, and said third outer honeycomb section.

11. A vehicle door including an impact-force absorbing element comprising the honeycomb block of claim 1.

* * * * *